Sept. 21, 1926.
P. L. WILBUR
SPRAYING APPARATUS
Filed August 11, 1920
1,600,526
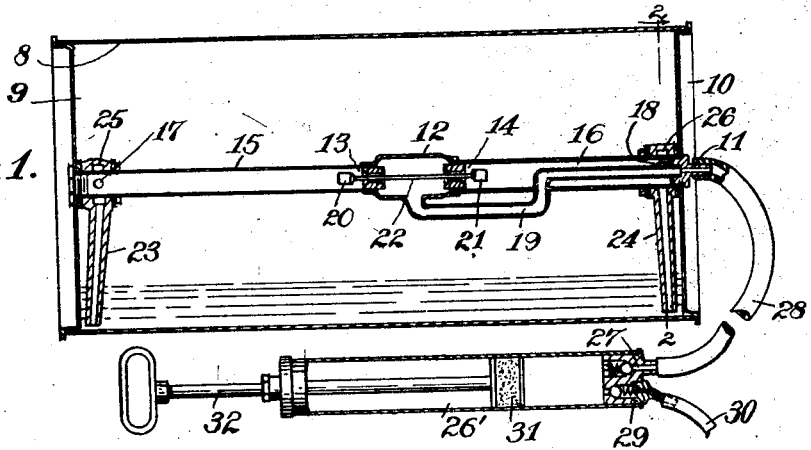
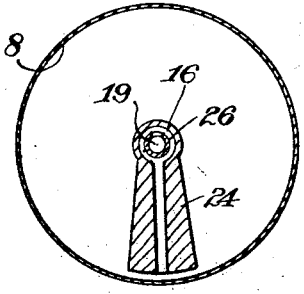
Inventor
P. L. Wilbur,
By his Attorney Patented Sept. 21, 1926.

1,600,526

UNITED STATES PATENT OFFICE.

PETER L. WILBUR, OF TUCKAHOE, NEW YORK, ASSIGNOR TO AMPYR MANUFACTURING COMPANY, INC., OF NEW YORK, N. Y., A CORPORATION OF NEW YORK.

SPRAYING APPARATUS.

Application filed August 11, 1920. Serial No. 402,922.

This invention relates to spraying devices in which a stream of liquid is ejected from a container or reservoir by a pressure, such as a fluid pressure, applied to the liquid in the container, or by a reduction of pressure in the container by withdrawing and discharging the liquid from the container by a pump, and it is the object of the invention to provide improved means to connect the outlet with the liquid in the container near the side and end which is lowermost in all positions of the container.

It is a further object of the invention to provide an improved arrangement of combined pump and liquid container to draw and discharge the liquid from the container, and of means to connect the pump with the liquid in the lowermost part of the container.

In the drawing accompanying and forming a part of this specification, Figure 1 is a sectional side elevation of a container illustrating an embodiment of my invention of connecting the outlet of the container with the liquid in the portion of the container which is lowermost, and showing a pump in connection with the same for withdrawing and discharging the liquid from the container.

Figure 2 is a sectional view taken on the line 2—2 of Figure 1 looking in the direction of the arrows.

Similar characters of reference designate like parts throughout the different views of the drawing.

In Figure 1 of the drawing I have shown an embodiment of my invention in connection with a container comprising a cylindrical body portion 8 having closures 9, 10 at the ends and an outlet 11 axially at one end thereof. A chamber 12 having opposed openings 13, 14 arranged with valve seats is arranged axially of the container with tubular extensions 15, 16 extending from the openings of the chamber to opposite ends of the container and whereby the chamber is supported in the container, said extensions having a lateral port or ports 17, 18 adjacent opposite ends of the container and opening thereinto to connect the chamber 12 with the container and the chamber with said extensions serving as a tubular trunnion. The chamber 12 has an outlet in the form of a tube 19 leading from the chamber at a point between the inlets 13, 14 and connected with the outlet 11 axially of the container and the extension 16 of the chamber 12 to constitute a continuation of the outlet of the container, for which purpose the tube 19 passes through the wall of said tubular extension 16 and extends therethrough for a portion of its length, the tube 19 being of less diameter than the tubular extension 16 to provide a passage therebetween for the liquid entering the port or ports 18 and valve port 14 into the chamber 12.

To connect the chamber 12 with the liquid in the container at the end portion which is lowermost gravity valve mechanism is provided comprising a pair of valves 20, 21, the valve 20 co-operating with the valve seat 13 to shut off one end of the chamber from the container and the other valve 21 co-operating with the valve seat 14 to shut off the other end of the chamber from the container. The valves are adapted to operate in unison whereby as one valve is seated such valve will operate to unseat the other valve, and for this purpose the valves are connected by a rod 22 extending through and being of greater length than the chamber, the valves operating to shut off the inlet which is uppermost and open the inlet which is lowermost. To connect the inlet ports 17, 18 to the extensions 15, 16 with the liquid near the side portion of the container which is lowermost intakes 23, 24 are provided comprising tubular members extending radially from the extensions to the side of the container rotatably mounted upon the extensions and having annular chambers 25, 26 with which the bores of the members and the ports of the extensions are at all times in communication. These intakes are preferably weighted and adapted to automatically assume a position with the inlet ends near the side portion of the container which is lowermost.

It will be obvious that should the end of the container at the right as viewed from Figure 1 be tilted downward from the horizontal that the valve 20 will be caused to be seated by gravity to close the port 13 of the chamber 12, thereby connecting the chamber with the container through the intake 24 and the outlet 11 and tubular extension 16, and the outlet 11 through the tube 19 with the chamber. Should the end of the container at the left be tilted downward the outlet 11 will be connected with the liquid at said end of the container through the intake 23, tubular extension 15, inlet 13 of chamber 12 and outlet tube 19, the chamber being disconnected from the upper end of the container by the valve 21 seating on and closing the valve port 14.

To discharge the contents of the container while mounted upon a stationary support or while carried on the back of the user a pump of suitable type is provided, a pump of the single acting type being shown consisting of a cylinder 26' having a valve controlled suction inlet 27 connected by a tube 28 with the outlet of the container, and a valve controlled outlet 29 to which a flexible hose 30 or nozzle may be connected. A piston 31 is reciprocable in the cylinder by a rod 32 connected to the piston having an operating handle exterior of the cylinder.

Having thus described my invention I claim:—

1. The combination with a cylindrical liquid carrying container, of a chamber fixed in said container to extend axially from the end to end thereof and having inlet ports at opposite ends within the container and an outlet to the exterior of the container leading from a point between the inlets; tubular intakes independently movably mounted axially of the container in communication with the inlets of the chamber at the respective ends thereof in position to rotate about the axis of said chamber operable by gravity to position the inlets to said intakes near the side and below the axis of the container; and gravity valve mechanism arranged in the chamber at opposite sides of the outlet operable to open communication between the intake which is at the end of the container which is lowermost and the outlet of the chamber and shut off from the outlet the intake of the chamber which is uppermost.

2. The combination of a cylindrical liquid carrying container having an outlet axially at one end; a chamber fixed axially in said container extending from end to end thereof, said chamber having inlets thereto adjacent the respective ends of the container and connected in communication with the outlet from a point between the inlets; valve mechanism in said chamber operable to open communication between the outlet and the inlet to the chamber which is lowermost and shut off communication between the outlet and the inlet to the chamber which is uppermost; and intakes to the inlets of said chamber rotatably supported upon the chamber at the respective ends thereof in position to rotate about the axis of said chamber and adapted to assume a position by gravity near the side and below the axis of the container.

3. The combination with a cylindrical liquid carrying container having an outlet, of a chamber axially fixed in the container connected to the outlet and having inlets to opposite ends thereof from near opposite ends of the container; gravity operating valve mechanism in said chamber operable to open communication between the outlet of the container and the inlet to the chamber which is lowermost and shut communication between the outlet of the container and the inlet to the chamber which is uppermost; and intakes rotatably supported upon the chamber at the respective ends thereof in position to rotate about the axis of said chamber in communication with the inlets thereto and adapted to assume a position by gravity below the axis of the container with the inlets thereto near the side wall of the container.

4. The combination with a cylindrical liquid carrying container having an outlet, of a chamber having opposed axial inlets arranged with valve seats and a connection with the outlet of the container from a point between the inlets to the chamber; tubes fixed in said inlets of the chamber extending to opposite ends of the container whereby the chamber is fixed axially in the container, said extensions having inlets near opposite ends of the containers; gravity valves for the inlets of the chamber operable to cooperate with the valve seats to shut off communication between the chamber and the tube which is uppermost and simultaneously open communication between the chamber and the tube which is lowermost, and intakes at the respective ends of the tubes to rotate about the axis thereof in fluid communication with the inlets to the tubes and adapted to assume a position by gravity below the axis of the container to connect the valve chamber with the liquid in that portion of the container which is lowermost.

5. The combination with a cylindrical liquid carrying container having an outlet axially thereof, of a chamber in the container having opposed axial inlets arranged with valve seats, tubular extensions in communication with the inlets of the chamber and extending to and fixed at opposite ends axially of the container to support the chamber, said tubular extensions having inlets thereto at said ends; gravity valves operable in unison to close communication between the chamber and the tube which is uppermost and open communication between the chamber and the tube which is lowermost, and an outlet tube leading from between the valves of the chamber and extending through a tubular extension and connected to the outlet of the container to constitute a continuation thereof; and intakes rotatably supported on the tublular extensions at opposite ends of the container in fluid communication with the inlets to the tubular extensions and the free ends adapted to assume a position by gravity near the side portion of the container which is lowermost.

Signed at New York city in the county of and State of New York this 13th day of July, 1920.

PETER L. WILBUR.